United States Patent Office.

ANSON C. TICHENOR, OF SAN FRANCISCO, CALIFORNIA.

ALLOY.

SPECIFICATION forming part of Letters Patent No. 330,072, dated November 10, 1885.

Application filed February 27, 1885. Serial No. 157,233. (No specimens.)

*To all whom it may concern:*

Be it known that I, ANSON C. TICHENOR, a citizen of the United States, residing at San Francisco, in the county of San Francisco and State of California, have invented certain new and useful Improvements in Alloys, of which the following is a specification.

My invention relates to a new and useful improvement in alloys to be used for mechanical purposes, and especially in chemical batteries; and it consists of certain ingredients composing the compound, which will be more fully hereinafter described, and definitely pointed out in the claim.

The object of my invention is to produce an alloy which shall be useful in the arts, and especially useful when rolled into plates as a substitute for the zinc plates at present used in chemical batteries.

My composition consists of the following ingredients, combined in the proportions stated, viz: chemically pure lead, three parts; zinc, one part; spiegeleisen, one part.

The spiegeleisen used in making this alloy is composed of iron, manganese, and carbon in about the following proportions: iron, seventy-five to ninety parts; manganese, four to twenty parts; carbon, about five parts. It will also be understood that ferro-manganese may be used instead of spiegeleisen, if desired. These ingredients are to be mixed in the manner which I will now describe.

The lead and zinc, in about the proportions mentioned, are melted in any suitable vessel or crucible adapted for the purpose, and the combined mixture raised to a temperature of about 1,200° Fahrenheit. The spiegeleisen, in about the proportion mentioned, is melted in a separate vessel, and when the same has attained a desired form of fluidity, which is well-known in the art, it is poured into or intermixed with the lead and zinc in the first-mentioned crucible. While the compound is in a molten state it may be cast into any suitable form or design.

When plates of the material are desired, they may be formed by passing blocks of the alloy through a rolling-mill of any well-known form.

Plates, bars, and disks of this alloy or pieces thereof in any other suitable form I use as substitutes for the zinc plate or plates of other metals now used in chemical batteries, applying them in a manner similar to the said zinc plates.

In the use of this alloy as a substitute for zinc or other metals in batteries I find that a stronger current of electricity is generated than where zinc or other metals are used, and that the acids in said batteries do not affect the plates formed of said alloy as they do zinc or other plates, thus increasing the life of a battery and cheapening its expense.

I have also found this alloy useful for metallic roofing and for other purposes where sheet metal is employed, as it is tough and strong, and is less affected by the action of the elements than tin, copper, or other metals.

It is evident that the proportion of these metals may be varied; but I have obtained the best results when they are compounded or mixed in substantially the proportions herein named.

Having thus described my invention, what I claim as new, and desire to secure by Letters Patent, is—

As an article of manufacture, an alloy composed of lead, zinc, iron, and manganese, compounded in substantially the proportions herein described.

In testimony whereof I affix my signature in presence of two witnesses.

ANSON C. TICHENOR.

Witnesses:
CHARLES S. HYER,
RUSSELL H. SCOTT.